(12) United States Patent
Maeda et al.

(10) Patent No.: US 9,488,051 B2
(45) Date of Patent: Nov. 8, 2016

(54) AXIALLY BALANCING A TURBINE USING LOW TEMPERATURE EXHAUST

(71) Applicant: KABUSHIKI KAISHA TOSHIBA, Tokyo (JP)

(72) Inventors: Hideyuki Maeda, Yokohama (JP); Tsuguhisa Tashima, Yokohama (JP); Shogo Iwai, Yokohama (JP); Nobuhiro Okizono, Yokohama (JP); Iwataro Sato, Hiratsuka (JP); Kazutaka Tsuruta, Yokohama (JP); Naoyuki Okamura, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 618 days.

(21) Appl. No.: 13/788,367

(22) Filed: Mar. 7, 2013

(65) Prior Publication Data

US 2014/0023478 A1 Jan. 23, 2014

(30) Foreign Application Priority Data

Jul. 20, 2012 (JP) ................................. 2012-161941

(51) Int. Cl.
*F01D 3/04* (2006.01)
*F01D 11/04* (2006.01)
(Continued)

(52) U.S. Cl.
CPC ................. *F01D 3/04* (2013.01); *F01D 11/04* (2013.01); *F01D 25/168* (2013.01); *F01D 25/26* (2013.01); *F02C 1/08* (2013.01); *F02C 3/34* (2013.01); *F05D 2260/61* (2013.01)

(58) Field of Classification Search
CPC ........ F01D 3/04; F01D 11/04; F01D 25/168; F01D 25/26; F05D 2210/13; F05D 2240/52; F05D 2240/55; F05D 2260/15; F05D 2260/61; F02C 1/08; F02C 3/34; F02C 7/06; F04D 29/052

See application file for complete search history.

(56) References Cited

U.S. PATENT DOCUMENTS 4,615,657 A 10/1986 Kreitmeier
5,141,389 A * 8/1992 Bear et al. ...................... 415/30

(Continued)

FOREIGN PATENT DOCUMENTS

BE 421535 5/1937
DE 10 2008 022 966 A1 12/2009

(Continued)

OTHER PUBLICATIONS

Extended Search Report issued Apr. 18, 2013 in European Application No. 13158172.0.

(Continued)

*Primary Examiner* — Bryan Lettman
*Assistant Examiner* — Timothy P Solak
(74) *Attorney, Agent, or Firm* — Oblon, McClelland, Maier & Neustadt, L.L.P.

(57) ABSTRACT

A single-flow turbine using $CO_2$ as a working fluid. The turbine includes a balance piston portion configured to optimize an axial load of a rotor on a bearing with a fluid having a temperature lower than a temperature of the working fluid introduced into the turbine, wherein a flow path in which at least a part of the fluid passing through the balance piston portion is extracted from a middle part of the passing, and in which at least a part of the extracted fluid is urged to flow to a middle part of a passage where the working fluid passes and where rotor blades at a plurality of stages are provided, is formed at the turbine.

4 Claims, 2 Drawing Sheets

(51) Int. Cl.
   *F01D 25/16* (2006.01)
   *F02C 1/08* (2006.01)
   *F02C 3/34* (2006.01)
   *F01D 25/26* (2006.01)

(56) References Cited

U.S. PATENT DOCUMENTS

| | | | | |
|---|---|---|---|---|
| 5,154,048 A | * | 10/1992 | Ponziani et al. | 60/792 |
| 2005/0076645 A1 | * | 4/2005 | Frutschi et al. | 60/772 |
| 2007/0199300 A1 | * | 8/2007 | MacAdam | F01K 17/025 60/39.52 |
| 2008/0213085 A1 | * | 9/2008 | Deidewig | F01D 3/04 415/104 |
| 2008/0246281 A1 | * | 10/2008 | Agrawal et al. | 290/52 |
| 2010/0034641 A1 | * | 2/2010 | Ikeda | F01D 25/26 415/116 |

FOREIGN PATENT DOCUMENTS

| | | |
|---|---|---|
| JP | 56-138405 A | 10/1981 |
| JP | 57-163103 A | 10/1982 |
| JP | 62-31703 U | 2/1987 |
| JP | 1-237394 | 9/1989 |
| JP | 2890907 | 2/1999 |
| JP | 2001-140604 A | 5/2001 |
| JP | 2011-32954 A | 2/2011 |
| JP | 2011-202668 A | 10/2011 |

OTHER PUBLICATIONS

Office Action issued Aug. 4, 2015 in Japanese Patent Application No. 2012-161941 (with English language translation).

* cited by examiner

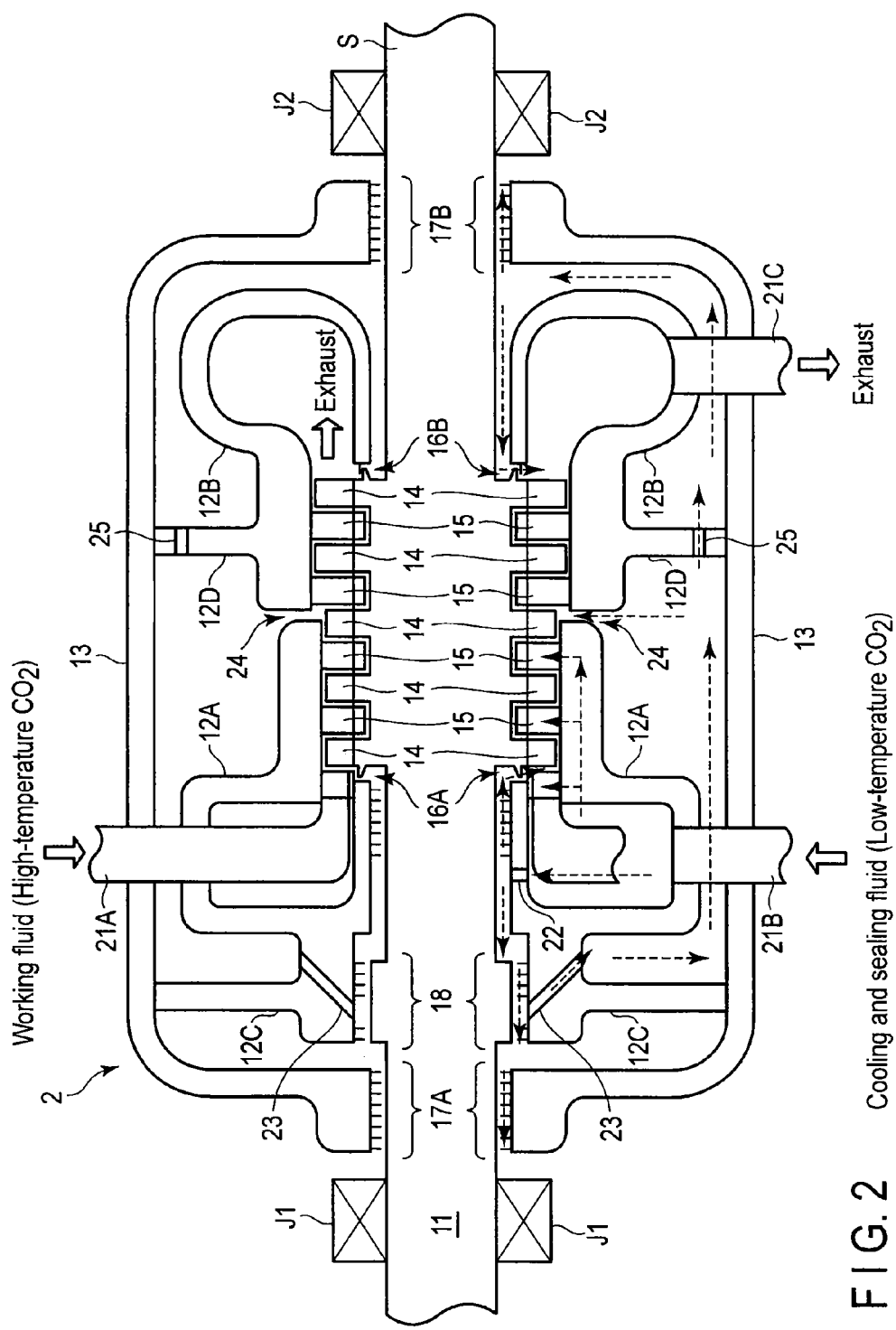
F I G. 2

AXIALLY BALANCING A TURBINE USING LOW TEMPERATURE EXHAUST

CROSS-REFERENCE TO RELATED APPLICATIONS

This application is based upon and claims the benefit of priority from Japanese Patent Application No. 2012-161941, filed Jul. 20, 2012, the entire contents of which are incorporated herein by reference.

FIELD

Embodiments described herein relate generally to a turbine and operating method of the same.

BACKGROUND

When a single flow turbine is employed in a thermal power system, a thrust load becomes great in one direction. It is therefore required that a balance piston portion having a labyrinth structure should be installed to optimize a load on a thrust bearing.

A single-flow steam turbine of a double casing structure comprising a labyrinth packing to prevent high-pressure and high-temperature steam, which flows into the casing and expands at a blade turbine stage in the casing, from leaking, at a through portion at which a rotor penetrates the casing, has been known. The rotor comprises a rotor blade and a balance piston. An inner casing comprises a stator blade, and forms a high-pressure blade turbine stage together with the rotor blade to surround the rotor. At the through portion at which the rotor penetrates the inner casing, a labyrinth packing is provided between a labyrinth ring of the inner casing and the balance piston.

A recovery pipe for leaking steam which penetrates the labyrinth ring from a middle portion of the labyrinth packing and extends to a steam inlet of a low-pressure blade turbine stage and which has a spout directed to the low-pressure blade turbine stage is provided in a steam chamber between the inner casing and an outer casing. The steam leaking from the labyrinth packing portion is extracted from the middle portion to flow from the spout to the low-pressure blade turbine stage through the recovering pipe and expand.

A steam turbine like the above needs to be equipped with a recovery pipe to recover steam leaking from the labyrinth packing portion. In addition, the recovery pipe needs to be formed of a material resistant to a high temperature since the leaking steam is hot.

Under the circumstances, it is desired to provide a turbine capable of being operated at good efficiency in a simple structure and a method of operating the turbine.

BRIEF DESCRIPTION OF THE DRAWINGS

FIG. 2 is a vertically cross-sectional view showing structures of main portions of a turbine in the thermal power system shown in FIG. 1.

DETAILED DESCRIPTION

Figure 1:
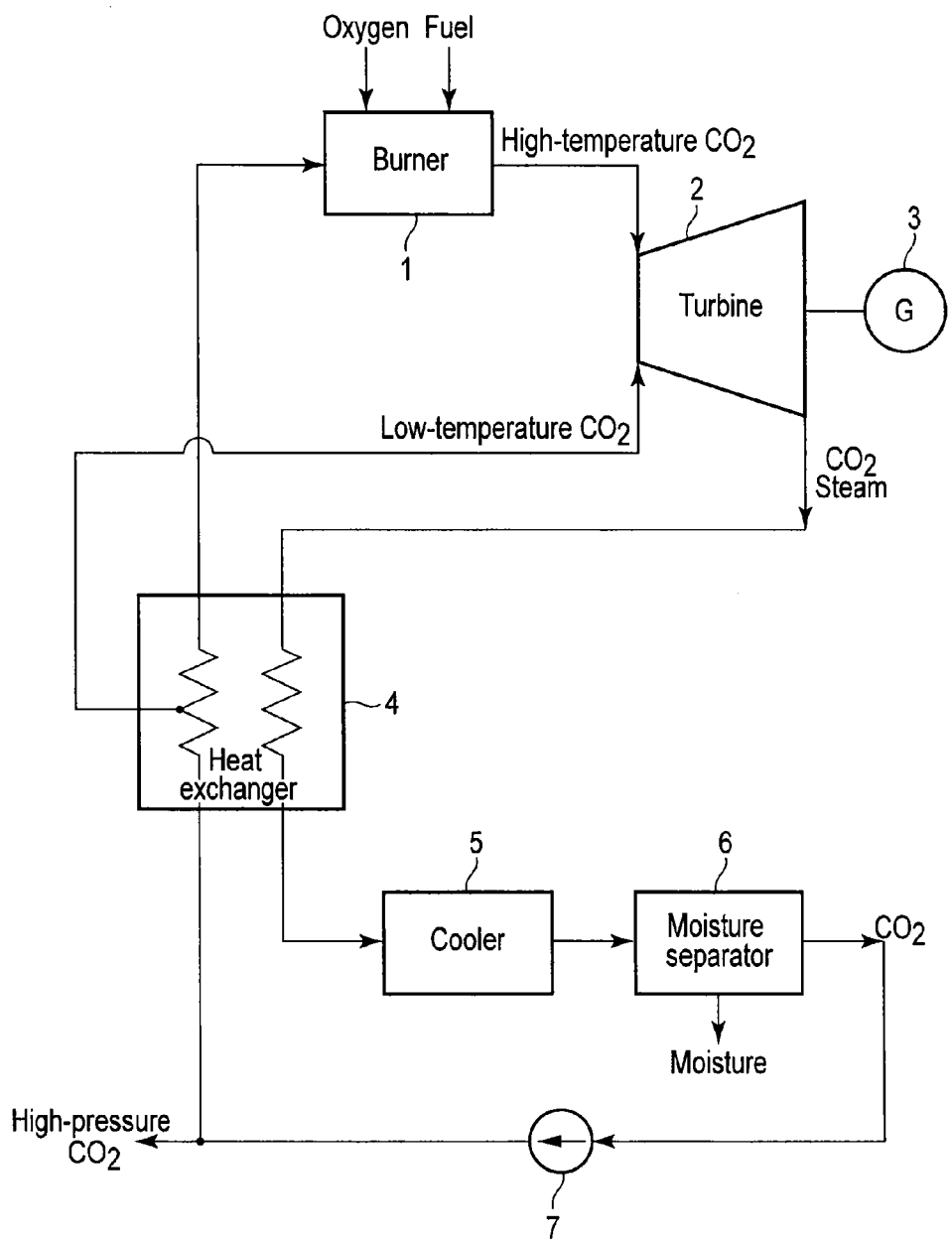
FIG. 1 is a block diagram showing a schematic structure of a thermal power system according to an embodiment.

Embodiments will be described below with reference to the drawings.

In general, according to one embodiment, there is provided a single-flow turbine using $CO_2$ as a working fluid. The turbine includes a balance piston portion configured to optimize an axial load of a rotor on a bearing with a fluid having a temperature lower than a temperature of the working fluid introduced into the turbine, wherein a flow path in which at least a part of the fluid passing through the balance piston portion is extracted from a middle part of the passing, and in which at least a part of the extracted fluid is urged to flow to a middle part of a passage where the working fluid passes and where rotor blades at a plurality of stages are provided, is formed at the turbine.

Recently, implementation of a thermal power system having good harmony with environment, capable of using $CO_2$ as an operating fluid of the turbine and simultaneously executing the power generation and the separation and recovery of $CO_2$ has been reviewed.

By constituting a recycling system of oxygen combustion using, for example, supercritical pressure $CO_2$ and by effectively using $CO_2$, a zero-emission system exhausting no $NO_X$ can be implemented.

In such a thermal power system, for example, a natural gas (methane, etc.) and oxygen are introduced into a burner and burnt, high-temperature $CO_2$ generated by the burning is used as a working fluid to turn the turbine and generate an electric power, gases ($CO_2$ and steam) exhausted from the turbine are cooled by a cooler, and moisture is separated from the gases. Then, $CO_2$ is compressed by a high-pressure pump to obtain high-pressure $CO_2$, and most of high-pressure $CO_2$ is heated by a heat exchanger and circulated to the burner while the remainder of high-pressure $CO_2$ is recovered and used for the other purpose.

FIG. 1 is a block diagram showing a schematic structure of a thermal power system according to an embodiment.

The thermal power system shown in FIG. 1 is a thermal power system having good harmony with environment, capable of using $CO_2$ as an operating fluid of the turbine and simultaneously executing the power generation and the separation and recovery of $CO_2$. In the thermal power system, a zero-emission system exhausting no $NO_X$ is implemented by constituting a recycling system of oxygen combustion using supercritical pressure $CO_2$ and by effectively using $CO_2$.

The thermal power system shown in FIG. 1 comprises, as main constituent elements, a burner 1, a turbine 2, a power generator 3, a heat exchanger 4, a cooler 5, a moisture separator 6, and a high-pressure pump 7. The burner 1 may be integrated with the turbine 2.

The burner 1 introduces high-pressure $CO_2$ obtained by recycling an exhaust gas of the turbine 2, introduces and burns fuel methane and oxygen, and generates high-temperature (e.g., about 1150° C.) $CO_2$.

The turbine 2 introduces high-pressure $CO_2$ generated from the burner 1 into the turbine as the working fluid, and urges high-pressure $CO_2$ to expand and rotate a rotor by means of a rotor blade. On the other hand, the turbine 2 introduces low-temperature (e.g., about 400° C.) $CO_2$ from a middle part of a flow path inside the heat exchanger 4 into the turbine as a cooling and sealing fluid, urges low-temperature $CO_2$ to execute cooling of the rotor blade and peripheral portions thereof (inner casing, etc.) and sealing for preventing the working fluid from leaking to the outside, and exhausts the gases ($CO_2$ and steam) which have finished expanding, and cooling and sealing, respectively.

The power generator 3 is arranged coaxially with the turbine 2 and generates electric power in accordance with the rotation of the turbine 2.

The heat exchanger 4 steals heat from the gases ($CO_2$ and steam) exhausted from the turbine 2 by heat exchange and supplies heat to $CO_2$ introduced again into the turbine 2. In this case, the heat exchanger 4 supplies $CO_2$ at, e.g., about 700° C. to the burner 1 and supplies $CO_2$ at, e.g., about 400° C. obtained from the middle part of the flow path inside the heat exchanger 4 to the turbine 2.

The cooler 5 further cools the gases from which the heat is stolen by the heat exchanger 4.

The moisture separator 6 separates moisture from the gases cooled by the cooler 5 and outputs $CO_2$ from which the moisture is removed.

The high-pressure pump 7 compresses $CO_2$ from which the moisture is removed by the moisture separator 6, outputs high-pressure $CO_2$, supplies most of high-pressure $CO_2$ to the heat exchanger 4 for reintroduction into the turbine and supplies the remainder of high-pressure $CO_2$ to the other installation.

In this structure, when high-pressure $CO_2$ obtained by recycling the exhaust gas of the turbine 2 is introduced into the burner 1 and fuel methane and oxygen are introduced and burnt, high-temperature $CO_2$ is generated. High-temperature $CO_2$ generated in the burner 1 is introduced from an upper part of an upstream stage side of the turbine 2 as the working fluid while low-temperature $CO_2$ supplied from the middle part of the flow path inside the heat exchanger 4 from a lower part of the upstream stage side of the turbine 2 as the cooling and sealing fluid. High-temperature $CO_2$ expands inside the turbine 2 and urges the turbine to rotate by means of the rotor blade while low-temperature $CO_2$ cools and seals the rotor blade and peripheral portions (inner casing, etc.) of the rotor blade. When the rotor of the turbine 2 rotates, the power generator 3 generates the electric power.

The gases ($CO_2$ and steam) which have finished expanding, and cooling and sealing are exhausted from the turbine 2, heat is stolen from the gases by the heat exchanger 4, the gases are further cooled by the cooler 5, the moisture is separated from the gases by the moisture separator 6, and $CO_2$ from which the moisture is removed is taken out. $CO_2$ from which the moisture is removed is taken out by the moisture separator 6 is compressed by the high-pressure pump 7 and output as high-pressure $CO_2$. Most of high-pressure $CO_2$ is supplied to the heat exchanger 4 for reintroduction into the turbine and the remainder of high-pressure $CO_2$ is supplied to the other installation. High-pressure $CO_2$ supplied to the heat exchanger 4 is given heat by the heat exchanger 4 and is supplied to the burner 1, and high-pressure $CO_2$ at a temperature lower than the temperature of the supplied high-pressure $CO_2$ is supplied to the turbine 2.

In this structure, high-purity high-pressure $CO_2$ can be recovered without independently providing an installation (CCS) configured to separate and recover $CO_2$. In addition, recovered high-pressure $CO_2$ can be stored, and can be effectively used, i.e., applied to EOR (Enhanced Oil Recovery) employed at an oil drilling site.

FIG. 2 is a vertically cross-sectional view showing structures of main portions of the turbine 2 in the thermal power system shown in FIG. 1. An arrow represented by a broken line in FIG. 2 indicates a flow of the cooling and sealing fluid. The arrow in a lower part of the turbine 2 is shown for brief description, but there is the same flow of the cooling and sealing fluid in an upper part of the turbine 2.

The turbine 2 shown in FIG. 2 is a single-flow turbine using $CO_2$ as the working fluid and comprises, as its main constituent elements, a rotor (rotational member) 11 in which an axle S is supported by bearings (journals, thrust bearings, etc.) J1 and J2, inner casings (stationary portions) 12A and 12B surrounding the rotor 11, and an outer casing (stationary portion) 13 surrounding the inner casings (stationary portions) 12A and 12B. The inner casing 12A comprises a partition wall 12C which supports the inner casing on the outer casing 13. The inner casing 12B comprises a partition wall 12D which supports the inner casing on the outer casing 13.

The rotor 11 comprises rotor blades 14 at a plurality of stages. The inner casings 12A and 12B comprise stator blades 15 arranged in accordance with positions of the rotor blades 14 at the plurality of stages on the rotor 11 side.

Wheel space sealing portions 16A and 16B configured to prevent the working fluid from leaking to the outside through gaps between the rotational member and the stationary portions are provided between end portions of the respective inner casings 12A, 12B and a through portion of the rotor 11.

Grand sealing portions 17A and 17B configured to prevent the working fluid or the cooling and sealing fluid from leaking to the outside are provided between both end portions of the outer casing 13 and the through portion of the rotor 11.

A balance piston portion 18 configured to optimize an axial load of the rotor 11 on the bearings J1 and J2, is provided between the wheel space sealing portion 16A and the grand sealing portion 17A on the upstream stage side.

A feed pipe 21A through which high-pressure, high-temperature $CO_2$ is introduced as the working fluid is provided at an upper part of the upstream stage side of the turbine 2. A feed pipe 21B through which low-temperature $CO_2$ having a pressure higher than the pressure of the working fluid is introduced as the cooling and sealing fluid is provided at a lower part of the upstream stage side of the turbine 2. An exhaust pipe 21C through which the gases ($CO_2$ and steam) having finished the expanding and cooling and sealing are exhausted is provided at a lower part of the downstream stage side of the turbine 2.

A through hole 22 through which a part of the fluid introduced through the feed pipe 21B is allowed to flow to the wheel space sealing portion 16A side and the balance piston portion 18 side is provided at the inner casing 12A. In addition, a balance piston extraction hole 23 through which at least a part of the fluid flowing at the balance piston portion 18 is extracted during the flow and allowed to flow between the inner casings 12A, 12B and the outer casing 13, more specifically, allowed to flow into a space surrounded by the inner casings 12A and 12B, the outer casing 13, and the partition walls 12C, 12D is provided at the inner casing 12A.

A gap 24 through which a part of the fluid flowing through the balance piston extraction hole 23 is allowed to flow to a middle part (e.g., a specific downstream stage) of the path where the working fluid passes and the rotor blades 14 and the stator blades 15 at a plurality of stages are provided, is provided between the inner casing 12A and the inner casing 12B.

A through hole 25 through which a part of the fluid flowing through the balance piston extraction hole 23 is allowed to flow to the wheel space sealing portion 16B through a space surrounded by the inner casing 12B, the outer casing 13, the partition wall 12D and the axle S, is provided at the partition wall 12D.

In this structure, when high-temperature $CO_2$ is introduced into the feed pipe 21A as the working fluid, the working fluid introduced into the feed pipe 21A passes through the rotor 11 and the inner casings 12A, 12B, expands and urges the rotor 11 to rotate by means of the rotor blades 14. In contrast, when low-temperature $CO_2$ is introduced into the feed pipe 21B as the cooling and sealing fluid, a part of the fluid introduced into the feed pipe 21B flows to the inside (nozzle, etc.) of the stator blades 15 at a plurality of stages to cool the stator blades 15. In addition, the other part of the fluid introduced into the feed pipe 21B passes through the through hole 22.

A part of the fluid passing through the through hole 22 flows to the wheel space sealing portion 16A, and seals the wheel space sealing portion 16A as the sealing fluid to prevent the working fluid from leaking from the wheel space sealing portion 16A. In addition, the other part of the fluid passing through the through hole 22 flows to the balance piston portion 18.

At least a part of the fluid flowing to the balance piston portion 18 is extracted by the balance piston extraction hole 23, and flows to the space surrounded by the inner casings 12A and 12B, the outer casing 13, and the partition walls 12C, 12D, through the balance piston extraction hole 23.

A part of the fluid flowing to the space through the balance piston extraction hole 23 passes through the gap 24 while cooling the surrounding, flows to the middle part (e.g., a specific downstream stage) of the path where the working fluid passes and the rotor blades 14 and the stator blades 15 are provided, joins the working fluid flowing from the upstream stage side and expands together with the working fluid, and urges the rotor to rotate by means of the rotor blades 14. In addition, a part of the fluid flowing to the space through the balance piston extraction hole 23 flows to the space surrounded by the inner casing 12B, the outer casing 13, the partition wall 12D and the axle S, through the through hole 25, further flows to the wheel space sealing portion 16B, and seals as the sealing fluid to prevent the working fluid from leaking from the wheel space sealing portion 16B.

In other words, by extracting at least a part of the cooling and sealing fluid through the balance piston extraction hole 23 at a stage at which the cooling and sealing fluid passing through the balance piston portion 18 still has a sufficient pressure, it is possible not only to cool the stator blades 15 and seal the wheel space sealing portion 16A by the fluid which is to be extracted, but also to cool the inner casings 12A, 12B, the outer casing 13, etc. or equalize the temperatures of the casings, execute expansion similarly to the working fluid, and seal the wheel space sealing portion 16B, by the extracted fluid.

For this reason, necessary cooling and sealing can be executed without introducing the fluid for cooling the inner casings 12A, 12B, the outer casing 13, etc. and sealing the wheel space sealing portion 16B, from a quite different system, and the improvement of the turbine output can be attempted.

Most of the gases ($CO_2$ and steam) which have finished expanding, and cooling and sealing are exhausted through the exhaust pipe 21C.

As described above, the turbine can be operated with good efficiency, in a simple structure, according to the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A single-flow turbine using $CO_2$ as a working fluid, comprising:
   a balance piston portion configured to control an axial load of a rotor on a bearing with a cooling fluid having a temperature lower than a temperature of the working fluid introduced into the turbine, the cooling fluid being generated by passing a fluid through a heat exchanger and a cooler,
   wherein a flow path in which at least a part of the cooling fluid passing through the balance piston portion is extracted from a middle part of the balance piston portion, and in which at least a part of the extracted cooling fluid is urged to flow to a middle part of a passage where the working fluid passes and where rotor blades at a plurality of stages are provided, is formed at the turbine.

2. The turbine according to claim 1, further comprising:
   a first casing surrounding the rotor; and
   a second casing surrounding the first casing,
   wherein at least the part of the extracted cooling fluid flows to the middle part of the passage where the working fluid passes and where rotor blades at the plurality of stages are provided, after passing between the first casing and the second casing.

3. The turbine according to claim 2, wherein at least the part of the extracted cooling fluid flows to a sealing portion configured to prevent the working fluid from leaking from a gap between the rotor and a stationary portion, after passing between the first casing and the second casing.

4. A turbine operating method for use in a single-flow turbine using $CO_2$ as a working fluid, the method comprising:
   controlling an axial load of a rotor on a bearing with a cooling fluid having a temperature lower than a temperature of the working fluid introduced into the turbine, by a balance piston portion, the cooling fluid being generated by passing a fluid through a heat exchanger and a cooler; and
   extracting at least a part of a cooling fluid passing through the balance piston portion from a middle part of the balance piston portion, and urging at least a part of the extracted cooling fluid to flow to a middle part of a passage of the working fluid where rotor blades at a plurality of stages are provided.

* * * * *